(12) United States Patent
Pobanz

(10) Patent No.: US 10,551,641 B1
(45) Date of Patent: Feb. 4, 2020

(54) METHOD AND SYSTEM OF A THREE-TERMINAL DRIVER FOR MODULATOR DEVICES

(71) Applicant: INPHI CORPORATION, Santa Clara, CA (US)

(72) Inventor: Carl Pobanz, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 7 days.

(21) Appl. No.: 14/226,649

(22) Filed: Mar. 26, 2014

Related U.S. Application Data

(60) Provisional application No. 61/919,570, filed on Dec. 20, 2013.

(51) Int. Cl.
*G02F 1/01* (2006.01)

(52) U.S. Cl.
CPC .......... *G02F 1/0121* (2013.01); *G02F 1/0123* (2013.01)

(58) Field of Classification Search
CPC ...... G02F 1/011; G02F 1/0121; G02F 1/0123; G02F 1/0327; G02F 1/076; G02F 1/1113; G02F 1/163; G02F 1/092; G02F 1/0516; G02F 1/21; G02F 1/218; G02F 1/225; G02F 1/2255; G02F 1/2257; G02F 2001/212
USPC .................. 98/183–198; 398/183–198, 1–3; 359/245
See application file for complete search history.

(56) References Cited

U.S. PATENT DOCUMENTS

| | | | | |
|---|---|---|---|---|
| 5,359,449 A * | 10/1994 | Nishimoto | ............ | G02F 1/0123 359/245 |
| 2005/0147136 A1* | 7/2005 | Pobanz | ................ | G02F 1/0121 372/26 |
| 2007/0247231 A1* | 10/2007 | Allen | .................... | H01P 1/2007 330/296 |
| 2011/0074487 A1* | 3/2011 | Behnia | .................. | G02F 1/0121 327/355 |
| 2012/0155880 A1* | 6/2012 | Nishimoto | ....... | H04B 10/50572 398/79 |
| 2014/0104666 A1* | 4/2014 | Minoia | ................... | G02F 1/225 359/245 |
| 2014/0355926 A1* | 12/2014 | Velthaus | ............... | G02F 1/2255 385/3 |

* cited by examiner

*Primary Examiner* — Marin Pichler
(74) *Attorney, Agent, or Firm* — Richard T. Ogawa; Ogawa P.C.

(57) ABSTRACT

An optical modulator device using three-terminal driver interface. The modulator device can include a driver circuit, three transmission lines, a pair of diodes, and a diode termination resistor. This device can have the diode termination resistor coupled to the first and third transmission lines. The three transmission lines can be coupled to the two diodes. The first diode can be coupled to the first and second transmission line and the second diode can be coupled to the second and third transmission lines. The second transmission line presents a relatively low impedance to the asymmetric current that reduces the current to levels that do not degrade the optical waveforms at either diode. The impedance appears in parallel with the high-frequency low-impedance synthesized by the differential drive interacting with the symmetric components of the diode load. This configuration results in a fast, well-controlled transient response.

18 Claims, 7 Drawing Sheets

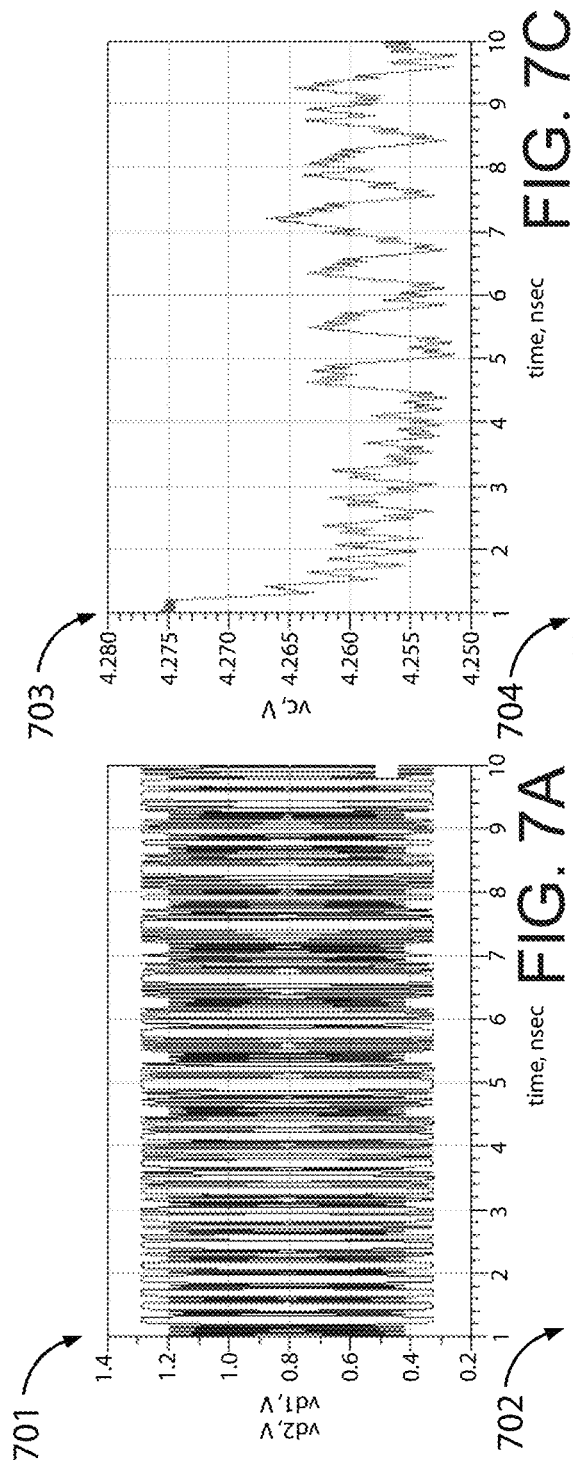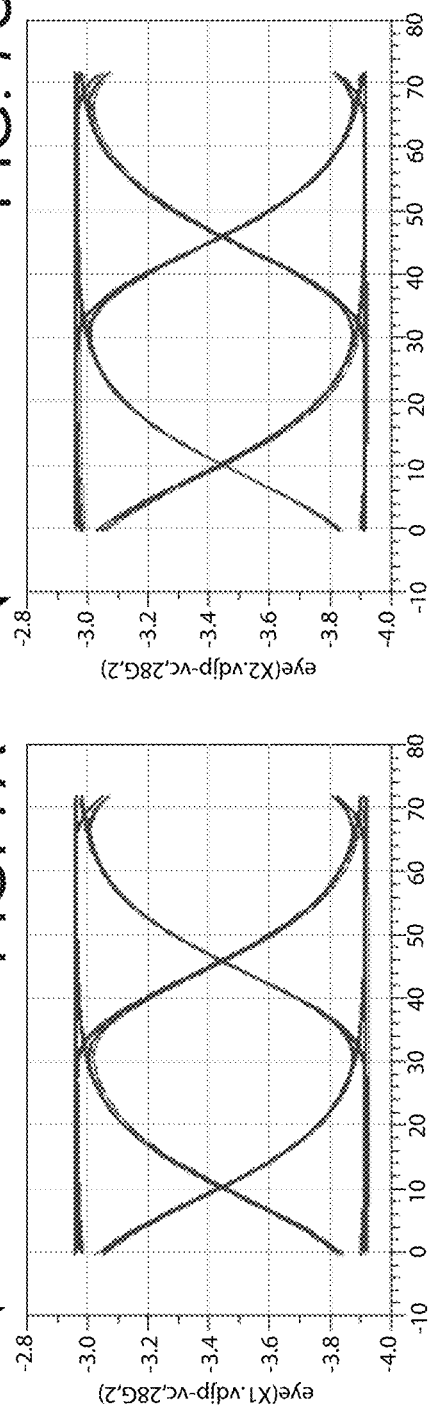

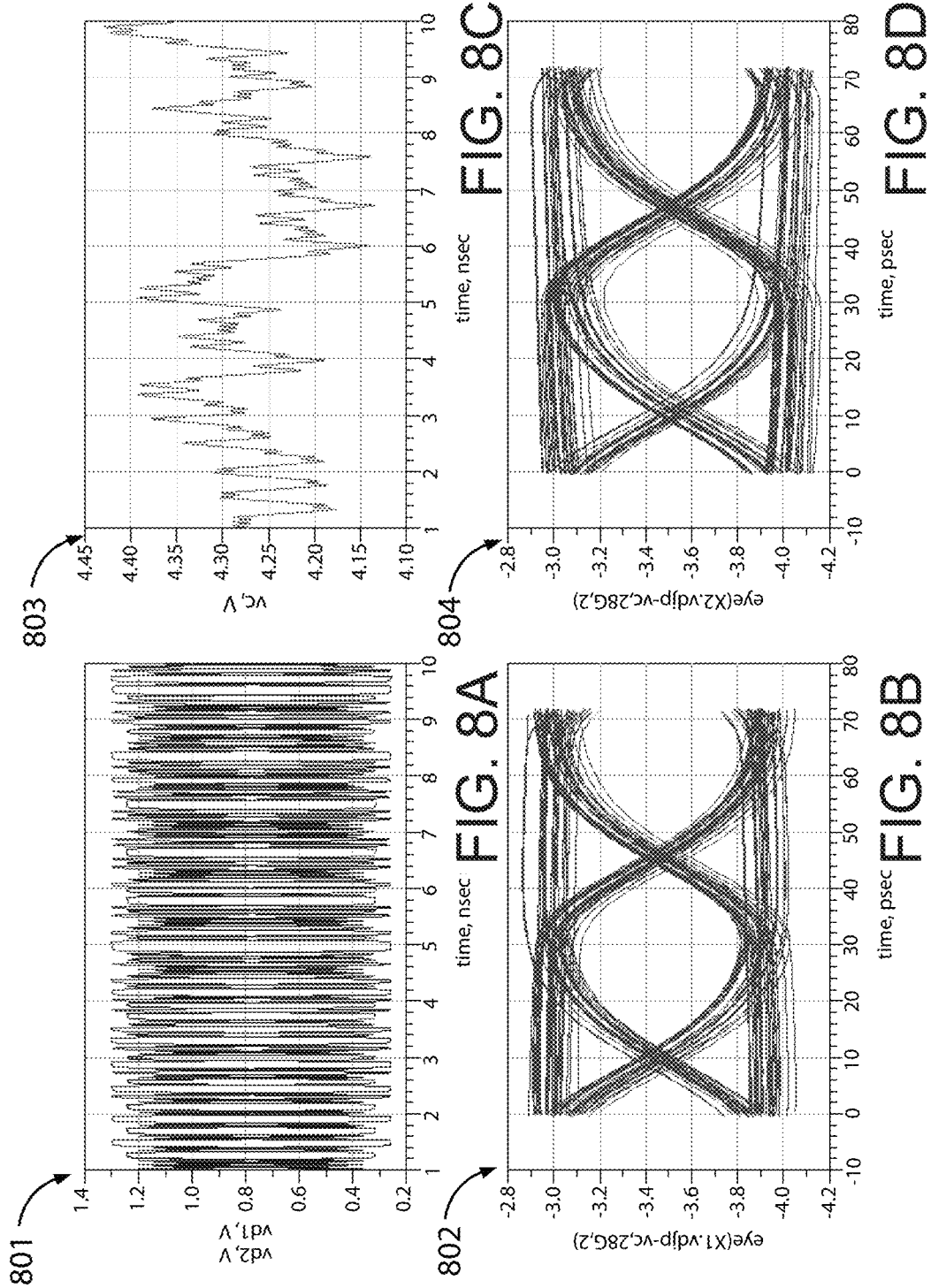

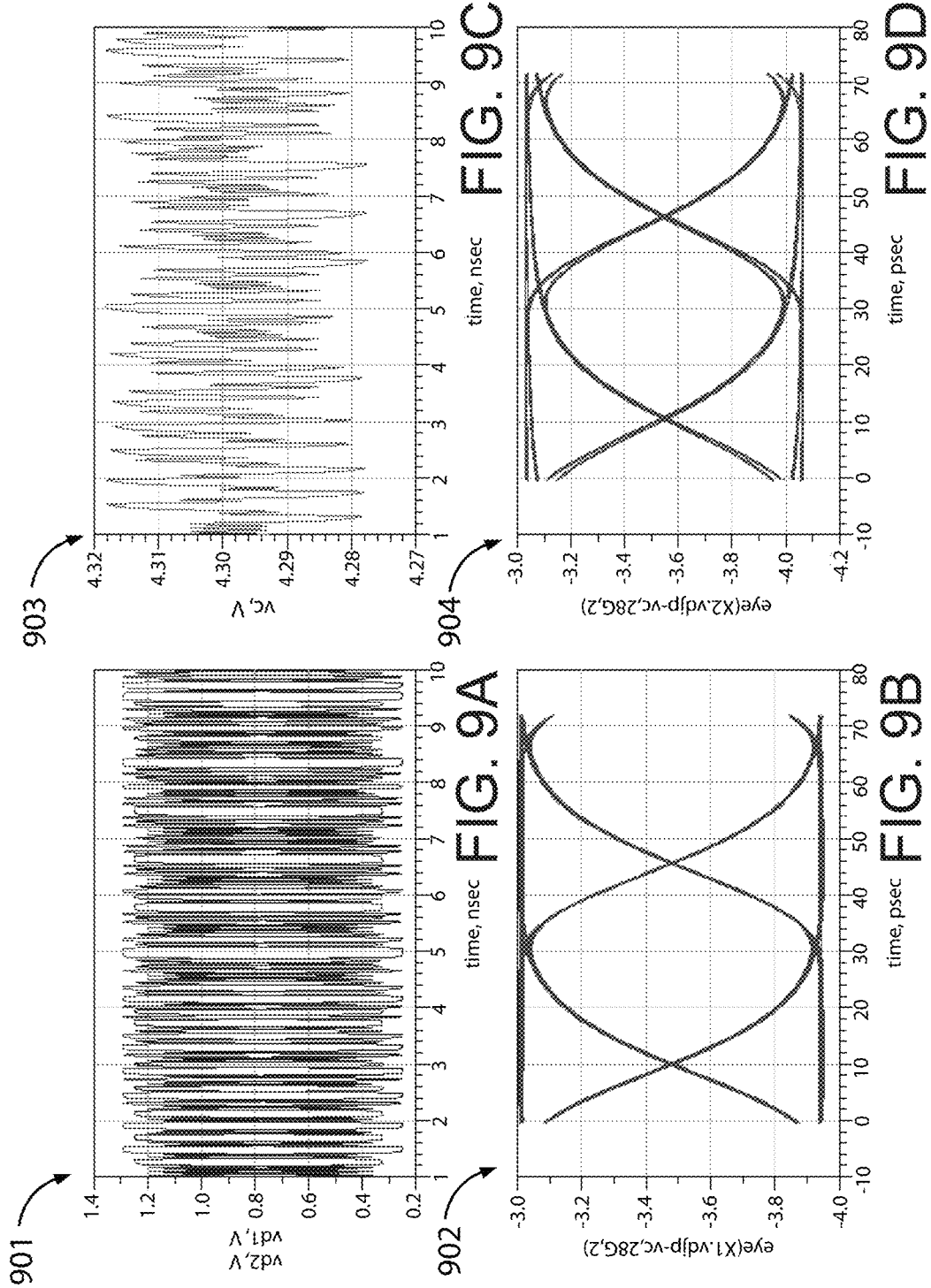

METHOD AND SYSTEM OF A THREE-TERMINAL DRIVER FOR MODULATOR DEVICES

CROSS-REFERENCES TO RELATED APPLICATIONS

The present application claims priority to and incorporates by reference, for all purposes, the following provisional application: U.S. Application No. 61/919,570 filed Dec. 20, 2013.

BACKGROUND OF THE INVENTION

The present invention relates to communication systems and integrated circuit (IC) devices. More particularly, the present invention provides an optical modulator device using a three-terminal driver interface.

Over the last few decades, the use of communication networks has exploded. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

CMOS technology is commonly used to design communication systems implementing Optical Fiber Links As CMOS technology is scaled down to make circuits and systems run at higher speed and occupy smaller chip (die) area, the operating supply voltage is reduced for lower power. Conventional FET transistors in deep-submicron CMOS processes have very low breakdown voltage as a result the operating supply voltage is maintained around 1 Volt. However, the Optical Modulators used in 100G-class optical links often require a bias voltage of more than 2 Volts across the anode and cathode nodes of the modulator for effective optical amplitude and/or phase modulation. These limitations provide significant challenges to the continued improvement of communication systems scaling and performance.

BRIEF SUMMARY OF THE INVENTION

The present invention relates to communication systems and integrated circuit (IC) devices. More particularly, the present invention provides an optical modulator device using a three-terminal driver interface. In an embodiment, the present invention provides an optical modulator device utilizing this three-terminal driver interface, as described below. The modulator device can include a driver circuit, three transmission lines, a pair of diodes, and a diode termination resistor. This device can have the diode termination resistor coupled to the first and third transmission lines.

The driver circuit can include a differential low-voltage driver circuit, which can be coupled to an internal Vdd, power supply, or the like. In an embodiment, the driver circuit can have a first, second, and third output denoted as P, R, and N, respectively. The first output P is coupled to the first transmission line, which is characterized by a first impedance. The second output R is coupled to the second transmission line, which is characterized by a second impedance. The third output N is coupled to the third transmission line, which is characterized by a third impedance. These outputs P, R, and N can represent signal transmissions as well.

The differential nature of the driver allows the ability to produce strong drive currents, which provides balance for better signal integrity at the driver, transmission lines, and on the diode load. Two differential data outputs, P and N, are coupled to the first and third transmission lines. The termination resistor can be configured to reduce signal reflections without affecting the configuration of the first and second diodes.

In a specific embodiment, the first impedance can be predetermined as a data line impedance, which can be the same as the third impedance. In FIG. 1, these impedances are denoted as Zo. The second impedance can be predetermined as a bias line impedance, which is denoted as Zr. In various embodiments, the impedances of these transmission lines can be configured as symmetrical or asymmetrical depending on the application.

The three transmission lines can be coupled to the two diodes. The first diode can be coupled to the first and second transmission line and the second diode can be coupled to the second and third transmission lines. In a specific embodiment, the first diode can have a first anode terminal coupled to the first transmission line and a first cathode terminal coupled to the second transmission line. The second diode can have a second anode terminal coupled to the third transmission line and a cathode terminal coupled to the second transmission line. These diodes can be reverse-biased modulator diodes configured as an electro-optical modulator (EOM) or an electro-absorption modulator (EAM), or the like.

Due to nonlinearity, the impedances of the two diodes will differ between on and off states, e.g. data high or low. In many cases, it is desirable to illuminate only one diode with optical power. These cases exhibit asymmetries that cause the currents in the two diodes to become unbalanced, which can degrade the modulation signal and produce distorted optical waveforms.

Embodiments of the present invention address this issue by introducing an additional transmission line (the second transmission line) and driver output R that generates a bias voltage and exhibits a broadband impedance to match that of the active transmission line. The additional transmission line, or the bias transmission line, presents a relatively low impedance to the asymmetric current that reduces the current to levels that do not degrade the optical waveforms at either diode. The impedance appears in parallel with the high-frequency low-Z (impedance) synthesized by the differential drive interacting with the symmetric components of the diode load (e.g. parasitic capacitances). This configuration results in a fast, well-controlled transient response.

Many benefits are recognized through various embodiments of the present invention. Such benefits include having the ability to effectively modulate optical signals having asymmetrical loads. Embodiments of this configuration also allows a faster driver transistor with lower breakdown voltage to directly apply the data signals, while the necessary DC bias can be generated by a slower, higher voltage transistor. Embodiments of the driver circuit can be fully integrated in a nanoscale CMOS process using fast low-V and slow high-V devices to maximize these advantages. The driver can also be directly coupled to modulators on a photonic IC without the need for external passive components other than patterned metal lines. Other benefits will be

BRIEF DESCRIPTION OF THE DRAWINGS

FIGS. 7A-7D are simplified graphs illustrating the device and signal characteristics of an optical modulator device according to an embodiment of the present invention.

FIGS. 8A-8D are simplified graphs illustrating the device and signal characteristics of an optical modulator device according to an embodiment of the present invention.

FIGS. 9A-9D are simplified graphs illustrating the device and signal characteristics of an optical modulator device according to an embodiment of the present invention.

DETAILED DESCRIPTION OF THE INVENTION

Figure 1:
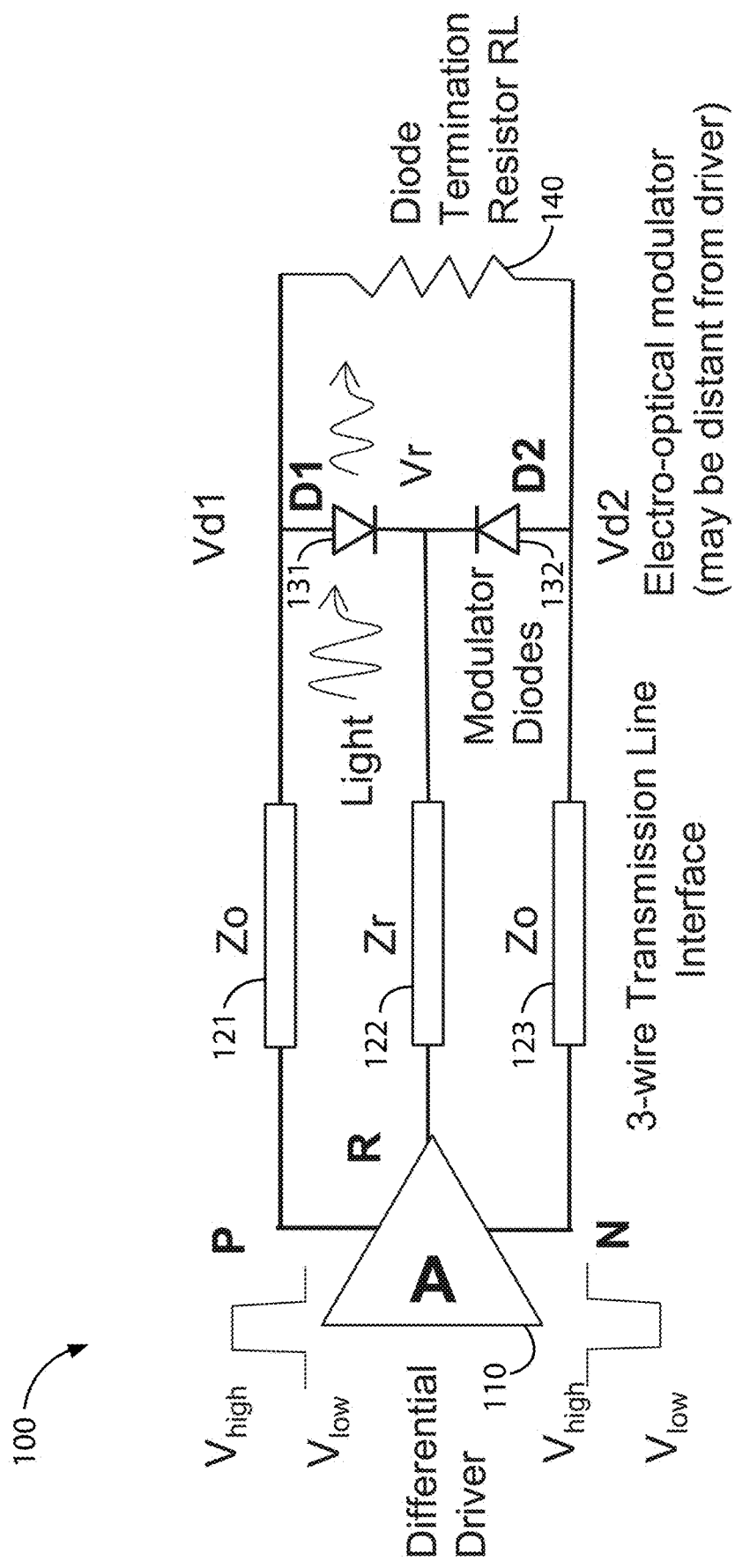
FIG. 1 is a simplified block diagram illustrating an optical modulator device according to an embodiment of the present invention.

The present invention relates to communication systems and integrated circuit (IC) devices. More particularly, the present invention provides a three-terminal driver system and method therefor.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

In an embodiment, the present invention provides an electro-optical modulator configured to allow a low voltage driver to directly drive an optical modulator device having a high voltage bias applied. The present configuration can provide this signal driving operation without compromise to bandwidth or signal integrity and without the need for external capacitors or inductors. The low voltage driver can apply a high-speed data signal across modulator diodes of the optical modulator device independent of a DC bias voltage, which is generally much higher than the data signal voltage.

FIG. 1 is a simplified block diagram illustrating an optical modulator device according to an embodiment of the present invention. As shown, device 100 includes a driver circuit 110, three transmission lines 121-123, a pair of diodes 131-132, and a diode termination resistor 140. The device 100 can have the diode termination resistor 140 coupled to the first and third transmission lines 121, 123. Those of ordinary skill in the art will recognize variations, modifications, and alternatives.

The driver circuit 100 can include a differential low-voltage driver circuit, which can be coupled to an internal Vdd, power supply, or the like. In an embodiment, the driver circuit can have a first, second, and third output denoted as P, R, and N, respectively. The first output P is coupled to the first transmission line 121, which is characterized by a first impedance. The second output R is coupled to the second transmission line 122, which is characterized by a second impedance. The third output N is coupled to the third transmission line 123, which is characterized by a third impedance. These outputs P, R, and N can represent signal transmissions as well.

The differential nature of the driver allows the ability to produce strong drive currents, which provides balance for better signal integrity at the driver, transmission lines, and on the diode load. Two differential data outputs, P and N, are coupled to the first and third transmission lines 121, 123. The termination resistor 140 can be configured to reduce signal reflections without affecting the configuration of the first and second diodes 131, 132. Resistor 140 is denoted as RL in FIG. 1.

In a specific embodiment, the first impedance can be predetermined as a data line impedance, which can be the same as the third impedance. In FIG. 1, these impedances are denoted as Zo. The second impedance can be predetermined as a bias line impedance, which is denoted as Zr. In various embodiments, the impedances of these transmission lines 121-123 can be configured as symmetrical or asymmetrical depending on the application. The first, second, and third transmission lines.

The three transmission lines 121-123 can be coupled to the two diodes 131-132. The first diode 131 can be coupled to the first and second transmission line and the second diode 132 can be coupled to the second and third transmission lines. In a specific embodiment, the first diode 131 can have a first anode terminal coupled to the first transmission line 121 and a first cathode terminal coupled to the second transmission line 122. The second diode 132 can have a second anode terminal coupled to the third transmission line 123 and a cathode terminal coupled to the second transmission line 122. These diodes 131, 132 can be reverse-biased modulator diodes configured as an electro-optical modulator (EOM) or an electro-absorption modulator (EAM), or the like.

Due to nonlinearity, the impedances of the two diodes will differ between on and off states, e.g. data high or low. In many cases, it is desirable to illuminate only one diode with optical power. These cases exhibit asymmetries that cause the currents in the two diodes to become unbalanced, which can degrade the modulation signal and produce distorted optical waveforms.

Embodiments of the present invention address this issue by introducing an additional transmission line (the second transmission line 122) and driver output R (as shown in FIG. 1) that generates a bias voltage and exhibits a broadband impedance to match that of the active transmission line. The additional transmission line, or bias transmission line 122, presents a relatively low impedance to the asymmetric current that reduces the current to levels that do not degrade the optical waveforms at either diode. The impedance appears in parallel with the high-frequency low-Z (impedance) synthesized by the differential drive interacting with the symmetric components of the diode load (e.g. parasitic capacitances). This configuration results in a fast, well-controlled transient response.

This configuration also allows a faster driver transistor with lower breakdown voltage to directly apply the data signals, while the necessary DC bias can be generated by a slower, higher voltage transistor. In a specific embodiment, the high voltage source R must only generate a broadband impedance match, which is a much easier task than generating a broadband signal. This driver can be fully integrated in a nanoscale CMOS process using fast low-V and slow high-V devices to maximize these advantages. This driver can also be directly coupled to modulators on a photonic IC without the need for external passive components other than patterned metal lines. Other benefits of these configurations will be recognized by those of ordinary skill in the art.

FIG. 1 shows one implementation of a circuit device including a driver and a 3-wire transmission line interface between the driver and a pair of modulator diodes. The driver 110 can excite the 3-wire transmission line interface to produce respective voltages Vd1, Vd2, and Vr at the diode terminals shown in FIG. 1. The resulting signal across the diodes is an RF data signal Vd–Vr across each diode, along with a reverse-bias DC voltage equal to the average of Vr subtracted from the average of Vd (average(Vd)–average (Vr)).

Other embodiments of the 3-terminal configuration are described in the following figures. Additional details regarding individual components and examples of operation can be found in the following figures and associated descriptions.

Figure 2:
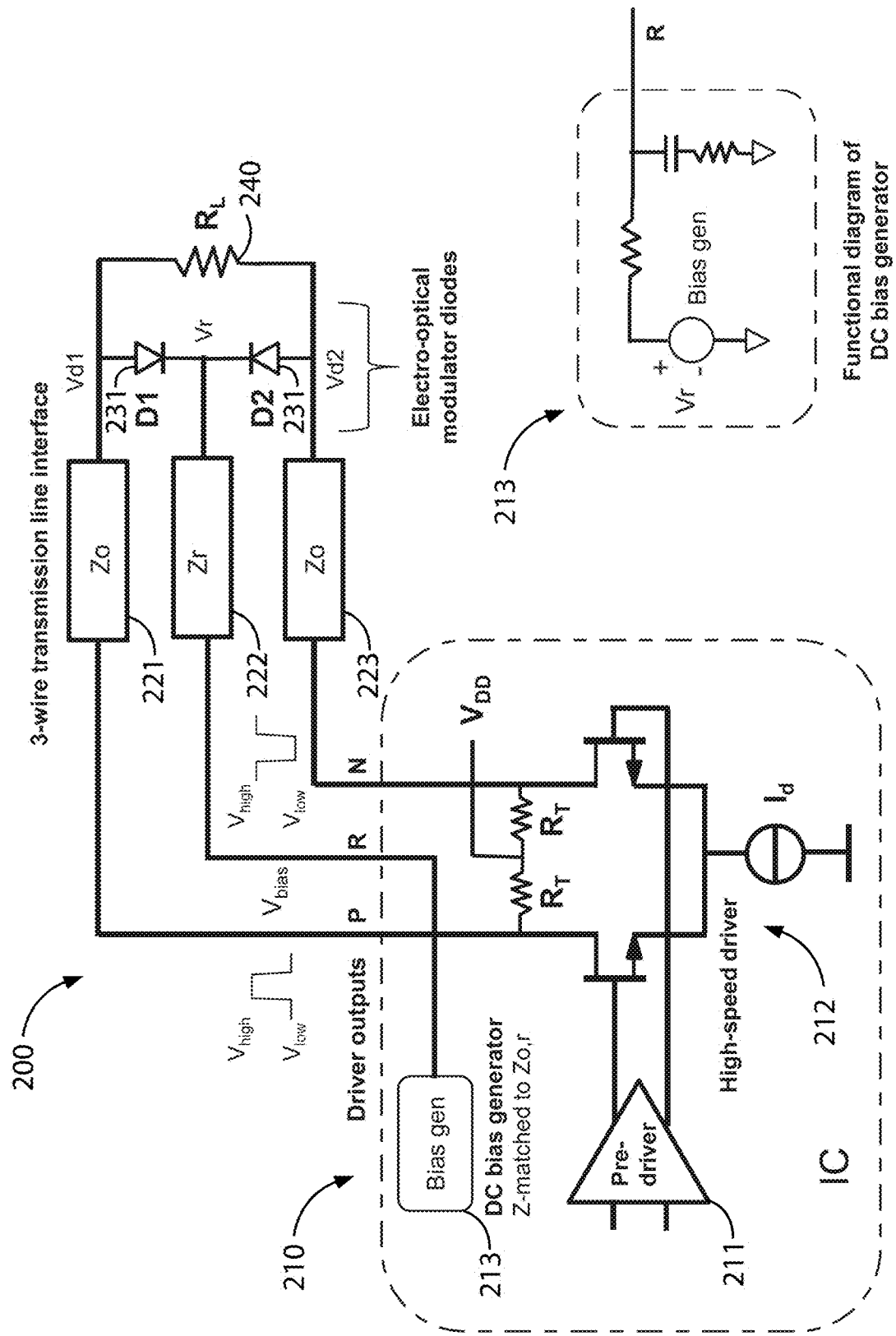
FIG. 2 is a simplified circuit diagram illustrating an optical modulator device according to an embodiment of the present invention.

FIG. 2 is a simplified circuit diagram illustrating an optical modulator device according to an embodiment of the present invention. As shown, device 200 includes a driver circuit 210, three transmission lines 221-223, a pair of diodes 231-232, and a diode termination resistor 240. The device 200 can have the diode termination resistor 240 coupled to the first and third transmission lines 221, 223. Those of ordinary skill in the art will recognize variations, modifications, and alternatives.

Similar to the embodiment of FIG. 1, the driver circuit 200 can include a differential low-voltage driver circuit, which can be coupled to an internal Vdd, power supply, or the like. In an embodiment, the driver circuit can have a first, second, and third output denoted as P, R, and N, respectively. The first output P is coupled to the first transmission line 221, which is characterized by a first impedance. The second output R is coupled to the second transmission line 222, which is characterized by a second impedance. The third output N is coupled to the third transmission line 223, which is characterized by a third impedance. These outputs P, R, and N can represent signal transmissions as well.

In a specific embodiment, the driver 200 can include a pre-driver circuit 211, a highspeed driver circuit 212, and a bias generator 213. The pre-driver 211 is shown to be coupled to the inputs of the high-speed driver circuit 212, which is coupled to an internal power supply Vdd through resistors RT. In high-speed driver shows a simplified symmetrical configuration with two transistors coupled to a current source Id with its outputs P and N coupled to the first and third transmission lines 221, 223, respectively.

The bias generator 213 is shown as a DC bias generator configured to provide an impedance (Z) matched to Zo or Zr, which are the impedances of the transmission lines. A more detailed functional diagram of the DC bias generator is shown to the right of the driver circuit 210. Inside the functional diagram, the bias generator is shown with a voltage source in a voltage divider configuration, specifically an RC filter configuration. Other circuit configurations can be used depending on specific applications.

The differential nature of the driver allows the ability to produce strong drive currents, which provides balance for better signal integrity at the driver, transmission lines, and on the diode load. Two differential data outputs, P and N, are coupled to the first and third transmission lines 221, 223. The termination resistor 240 can be configured to reduce signal reflections without affecting the configuration of the first and second diodes 231, 232. Resistor 240 is denoted as RL in FIG. 2.

In a specific embodiment, the first impedance can be predetermined as a data line impedance, which can be the same as the third impedance. In FIG. 2, these impedances are denoted as Zo. The second impedance can be predetermined as a bias line impedance, which is denoted as Zr. In various embodiments, the impedances of these transmission lines 221-223 can be configured as symmetrical or asymmetrical depending on the application. The first, second, and third transmission lines.

The three transmission lines 221-223 can be coupled to the two diodes 231-232. The first diode 231 can be coupled to the first and second transmission line and the second diode 232 can be coupled to the second and third transmission lines. In a specific embodiment, the first diode 231 can have a first anode terminal coupled to the first transmission line 221 and a first cathode terminal coupled to the second transmission line 222. The second diode 232 can have a second anode terminal coupled to the third transmission line 223 and a cathode terminal coupled to the second transmission line 222. These diodes 231, 232 can be reverse-biased modulator diodes configured as an electro-optical modulator (EOM) or an electro-absorption modulator (EAM), or the like.

Figure 3:
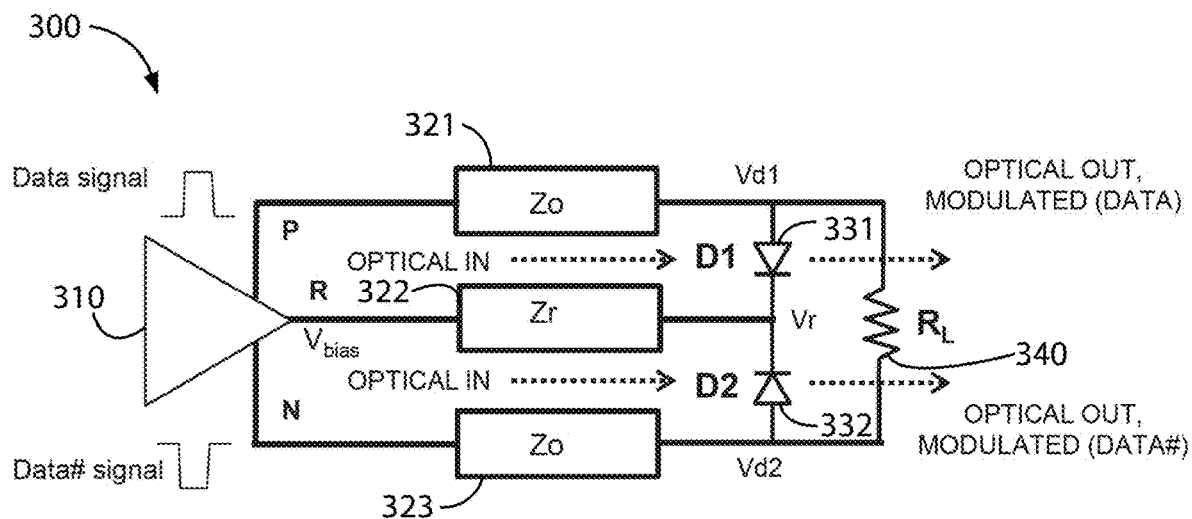
FIG. 3 is a simplified block diagram illustrating a symmetric optical modulator device according to an embodiment of the present invention.

FIG. 3 is a simplified block diagram illustrating a symmetric optical modulator device according to an embodiment of the present invention. As shown, device 300 includes a driver circuit 310, three transmission lines 321-323, a pair of diodes 331-332, and a diode termination resistor 340. The device 300 can have the diode termination resistor 340 coupled to the first and third transmission lines 321, 323. A detailed description of the modulator device 300 can be found in the description of FIGS. 1 and 2, which describe the analogous elements and configurations.

As described previously, the three-terminal modulator device can be configured in symmetrical and asymmetrical configurations. In FIG. 3, the optical modulator device is configured in a symmetrical operation. Data signals (Data, Data#) from both the P and N outputs (both differential outputs) are modulated through the first and second diodes 331, 332. The signal paths are shown by the dual signals (Data, Data#) traversing the optical input through the three-terminal interface to the optical output. The result is having both a modulated (Data) and a modulated (Data#), as shown in FIG. 3.

Figure 4:
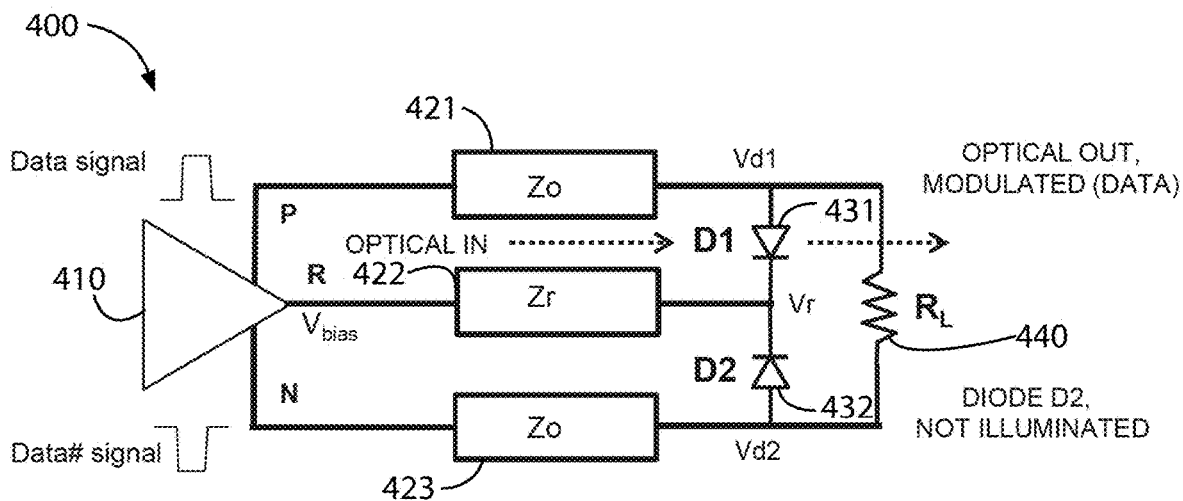
FIG. 4 is a simplified block diagram illustrating an asymmetrical optical modulator device according to an embodiment of the present invention.

FIG. 4 is a simplified block diagram illustrating an asymmetrical optical modulator device according to an embodiment of the present invention. As shown, device 400 includes a driver circuit 410, three transmission lines 421-423, a pair of diodes 431-432, and a diode termination resistor 440. The device 400 can have the diode termination resistor 440 coupled to the first and third transmission lines 421, 423. A detailed description of the modulator device 400 can be found in the description of FIGS. 1 and 2, which describe the analogous elements and configurations.

Compared to FIG. 3, FIG. 4 depicts an asymmetrical modulator configuration. In this scenario, the second diode 432 remains inactive (shown as 'Not Illuminated') while the optical input from the P output of the driver circuit 410 is modulated. As stated previously, it can be desirable to illuminate only one diode with optical power. These cases exhibit asymmetries that cause the currents in the two diodes to become unbalanced, which can degrade the modulation signal and produce distorted optical waveforms.

The introduction of the additional transmission line (the second transmission line 422) and driver output R (as shown in FIG. 4) mitigates the signal degradation by generating a bias voltage and exhibiting a broadband impedance to match that of the active transmission line. The additional transmission line, or bias transmission line 322, presents a relatively low impedance to the asymmetric current that reduces the current to levels that do not degrade the optical waveforms at either diode. The impedance appears in parallel with the high-frequency low-Z (impedance) synthesized by the differential drive interacting with the symmetric components of the diode load (e.g. parasitic capacitances). As shown in FIG. 4, this configuration results in a fast, well-controlled transient response.

Figure 5:
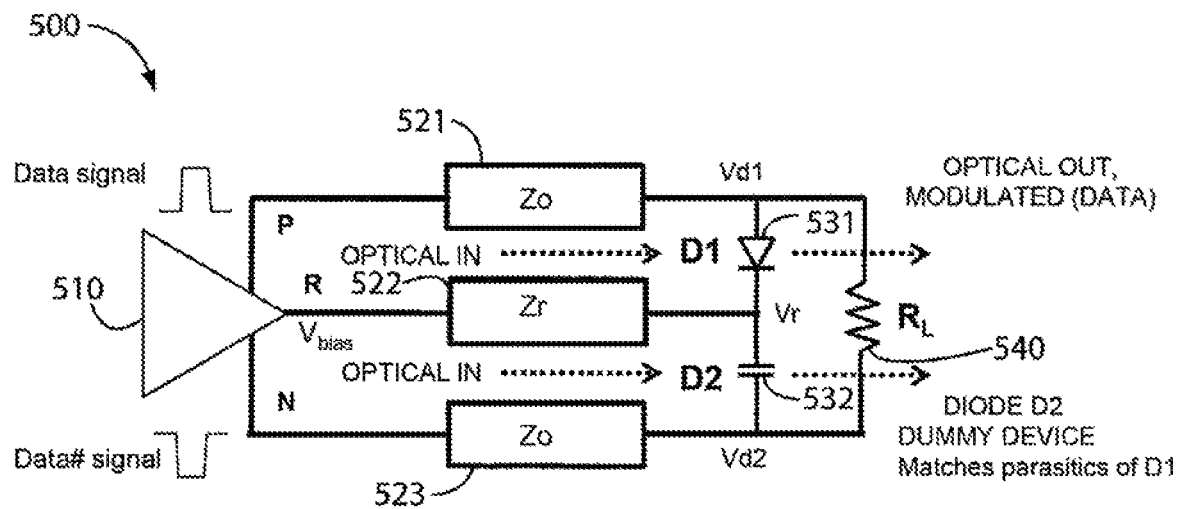
FIG. 5 is a simplified block diagram illustrating a symmetrical optical modulator device using a dummy device according to an embodiment of the present invention.

FIG. 5 is a simplified block diagram illustrating a symmetrical optical modulator device using a dummy device according to an embodiment of the present invention. As shown, device 500 includes a driver circuit 510, three transmission lines 521-523, a pair of diodes 531-532, and a diode termination resistor 540. The device 500 can have the diode termination resistor 540 coupled to the first and third transmission lines 521, 523. A detailed description of the modulator device 500 can be found in the description of FIGS. 1 and 2, which describe the analogous elements and configurations.

Compared to FIG. 4, FIG. 5 depicts a modulator configuration with the second diode 532 replaced with a dummy device. This dummy device can be a capacitor or other like structure. In this scenario, the dummy device matches the parasitics of the first diode 531 while the optical input from the P output of the driver circuit 410 is modulated. The device 500 of FIG. 5 shows an alternate configuration of asymmetrical modulator.

Figure 6:
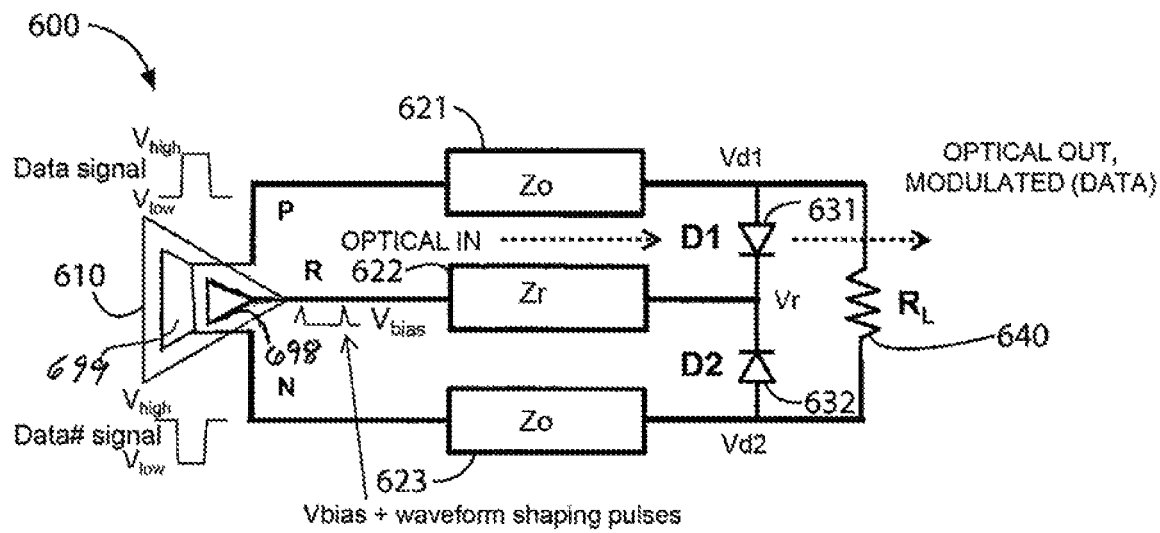
FIG. 6 is a simplified block diagram illustrating an asymmetrical optical modulator with waveform shaping pulses according to an embodiment of the present invention.

FIG. 6 is a simplified block diagram illustrating an asymmetrical optical modulator with waveform shaping pulses according to an embodiment of the present invention. As shown, device 600 includes a driver circuit 610, three transmission lines 621-623, a pair of diodes 631-632, and a diode termination resistor 640. The device 600 can have the diode termination resistor 540 coupled to the first and third transmission lines 621, 623. A detailed description of the modulator device 600 can be found in the description of FIGS. 1 and 2, which describe the analogous elements and configurations.

Device 600 of FIG. 6 has a similar configuration compared to FIGS. 3 and 4, but includes the outputting of waveform shaping pulses from the R output of the driver circuit 610. In a specific embodiment, the waveform shaping pulses can be utilized to improve the signal integrity of the modulation signal applied to the diode, such as by improving its waveform symmetry. As stated previously, the additional transmission line, or bias transmission line 322, presents a relatively low impedance to the asymmetric current that reduces the current to levels that do not degrade the optical waveforms at either diode. This embodiment can utilize a faster driver transistor 699 with lower breakdown voltage to directly apply the data signals, while the necessary DC bias can be generated by a slower, higher voltage transistor 698. Embodiments of these driver circuits of these modulator devices can be fully integrated in a nanoscale CMOS process using fast low-V and slow high-V devices to maximize these advantages.

This configuration depicts another asymmetrical modulator configuration that results in an operation characterized by fast and well-controlled transient responses. Those of ordinary skill in the art will recognize other variations, modifications, and alternatives. In order to clarify the benefits of these embodiments, graphs of voltage characteristics and electrical eye diagrams will be compared in the following figures.

FIGS. 7A-7D are simplified graphs illustrating the device and signal characteristics of an optical modulator device configured with a perfectly symmetric diode load. Graph 701 depicts an example of voltages measured over time (Vd1, Vd2/ns) at the first and second modulator diodes, similar to diodes 331 and 332 of FIG. 3. The Vd1 and Vd2 signals are shown as differential waveforms, which is consistent with these nodes being connected to the differential outputs of the driver circuit.

The resulting signal driven across the diodes is an RF data signal Vd–Vr across each diode, along with a reverse-bias DC voltage equal to the average of Vr subtracted from the average of Vd (average(Vd)–average(Vr)). Graph 703 depicts an example of the voltage characteristic over time at the diode cathodes (Vr/ns). In this example, the voltage at node Vr starts around 4.275V and decreases until it fluctuates between about 4.251V and about 4.267.

Graphs 702 and 704 show electrical eye diagrams over time (ps) at the junctions of diodes 1 and 2, respectively. As shown, these two graphs exhibit well-controlled transient responses. In this symmetrical case, the waveforms are stable with minimal noise or degradation.

FIGS. 8A-8D are simplified graphs illustrating the device and signal characteristics of an optical modulator device configured with an asymmetric optical illumination. Graph 801 depicts an example of voltages measured over time (Vd1, Vd2/ns) at the first and second modulator diodes. Similar to graph 701, the Vd1 and Vd2 signals are shown here as differential waveforms, which is consistent with these nodes being connected to the differential outputs of the driver circuit.

Here, the Vr node between the first and second diodes exhibits a high and/or uncontrolled impedance. Graph 803 shows the voltage at the diode cathodes (Vr), which shows the voltage level fluctuating between about 4.14V and about 4.43V. This fluctuation range is much greater than the symmetrical case of graph 703.

For the asymmetrical case, graphs 802 and 804 show electrical eye diagrams over time (ps) at the junctions of diodes 1 and 2, respectively. As shown, these two graphs exhibit degraded and uncontrolled transient responses. Compared to graphs 702 and 704, these waveforms are inconsistent, showing a large amount of variability. In this asymmetrical case, the optical modulation waveforms suffer from severe degradation caused by load asymmetry.

As described previously, these issues are due to nonlinearity in which the impedances of the two diodes will differ between on and off states, e.g. data high or low. In many cases, it is desirable to illuminate only one diode with optical power. These cases exhibit asymmetries that cause the currents in the two diodes to become unbalanced, which can degrade the modulation signal and produce distorted optical waveforms as shown in FIGS. 8B-D.

FIGS. 9A-9D are simplified graphs illustrating the device and signal characteristics of an optical modulator device configured with an asymmetric optical illumination and using the three-terminal configuration of the present invention. Graph 901 depicts an example of voltages measured over time (Vd1, Vd2/ns) at the first and second modulator diodes. Similar to graphs 701 and 801, the Vd1 and Vd2 signals are shown here as differential waveforms, which is consistent with these nodes being connected to the differential outputs of the driver circuit.

Here, the Vr node between the first and second diodes exhibits a low and controlled impedance. Graph 903 shows the voltage at the diode cathodes (Vr), which shows the voltage level fluctuating between about 4.278V and about 4.318V. This fluctuation range is much lower than the asymmetrical case of graph 803 and much closer to that of graph 703.

For the asymmetrical case, graphs 902 and 904 show electrical eye diagrams over time (ps) at the junctions of diodes 1 and 2, respectively. As shown, these two graphs exhibit well-controlled transient responses. Compared to graphs 802 and 804, these waveforms are much cleaner and improved, similar to graphs 702 and 704. In this asymmetrical case, the optical modulation waveforms the degradation from the load asymmetry is mitigated by the three-terminal interface using the bias line to match the impedance of the data lines.

These graphs represent the embodiments of the present invention that address this issue by introducing an additional transmission line (the bias line) and driver output R (as shown in FIG. 1) that generates a bias voltage and exhibits a broadband impedance to match that of the active transmission line. The additional transmission line, or bias transmission line, presents a relatively low impedance to the asymmetric current that reduces the current to levels that do not degrade the optical waveforms at either diode. The impedance appears in parallel with the high-frequency low-Z (impedance) synthesized by the differential drive interacting with the symmetric components of the diode load (e.g. parasitic capacitances). This configuration results in a fast, well-controlled transient response.

The benefits of the present invention for signal modulation can be clearly seen from these examples. Additionally, these embodiments can each utilize a faster driver transistor with lower breakdown voltage to directly apply the data signals, while the necessary DC bias can be generated by a slower, higher voltage transistor. Embodiments of these driver circuits of these modulator devices can be fully integrated in a nanoscale CMOS process using fast low-V and slow high-V devices to maximize these advantages. These driver circuits can also be directly coupled to modulators on a photonic IC without the need for external passive components other than patterned metal lines. Other benefits of these configurations will be recognized by those of ordinary skill in the art.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An apparatus comprising:
 a driver circuit having a first output, a second output, and a third output, the driver circuit comprising,
 a bias generator in electronic communication with the second output and comprising a first voltage source in a voltage divider configuration,
 a pre-driver circuit, and
 a high-speed driver circuit in electronic communication with the pre-driver circuit and with the first output and the third output, the high-speed driver circuit comprising,
 a first transistor having a first node in communication with the first output and with a second voltage source lower than the first voltage source, a second node in communication with a current source, and a switching node in communication with the pre-driver circuit,
 a second transistor having a first node in communication with the third output and with the second voltage source, a second node in communication with the current source, and a switching node in communication with the pre-driver circuit,
 a three-wire transmission line interface comprising:
 a first transmission line electrically having a first end coupled to the first output and characterized by a first impedance value,
 a second transmission line having a first end coupled to the second output and characterized by a second impedance value, and
 a third transmission line having a first end coupled to the third output and characterized by the first impedance value;
 a first modulator diode coupled to a second end of the first transmission line and a second end of the second transmission line; and
 a device coupled to the second end of the second transmission line and a second end of the third transmission line, such that a first current in the device is asymmetrical to a second current in the first modulator diode.

2. An apparatus as in claim 1 wherein the device has parasitics that match the first modulator diode and includes a capacitor.

3. An apparatus as in claim 1,
wherein the first modulator diode includes an anode coupled to the second end of the first transmission line and a cathode coupled to the second end of the second transmission line
wherein the device is a second modulator diode having an anode coupled to the second end of the third transmission line and a cathode coupled to the second end of the second transmission line.

4. An apparatus as in claim 1 wherein the second voltage supply is around 1V.

5. An apparatus as in claim 4 wherein the driver circuit is configured to generate a voltage of more than 2 Volts across the first modulator diode.

6. An apparatus as in claim 1 wherein the second impedance value matches the first impedance value.

7. An apparatus as in claim 1, further comprising a termination resistor coupled between the second end of the first transmission line and the second end of the third transmission line.

8. An apparatus comprising:
a driver circuit having a first output, a second output, and a third output, the driver circuit comprising,
a bias generator in electronic communication with the second output and comprising a first voltage source,
a pre-driver circuit, and
a high-speed driver circuit in electronic communication with the pre-driver circuit and with the first output and the third output, the high-speed driver circuit comprising,
a first transistor having a first node in communication with the first output and with a second voltage source at a voltage lower than the first voltage source, a second node in communication with a current source, and a switching node in communication with the pre-driver circuit,
a second transistor having a first node in communication with the third output and with the second voltage source, a second node in communication with the current source, and a switching node in communication with the pre-driver circuit,
a three-wire transmission line interface comprising:
a first transmission line electrically coupled to the first output and characterized by a first impedance value,
a second transmission line electrically coupled to the second output and characterized by a second impedance value, and
a third transmission line electrically coupled to the third output and characterized by the first impedance;
a first modulator diode on a photonic integrated circuit and directly coupled between the first transmission line and the second transmission line by respective patterned metal lines without a need for external passive components other than the patterned metal lines, the first modulator diode configured as an electro-optical modulator (EOM) or an electro-absorption modulator (EAM); and
a device coupled between the second transmission line and the third transmission line, such that a first current in the device is asymmetrical to a second current in the first modulator diode.

9. An apparatus as in claim 8 wherein the bias generator comprises the first voltage source in a voltage divider configuration.

10. An apparatus as in claim 9 wherein the voltage divider configuration comprises a resistor capacitor (RC) filter configuration.

11. An apparatus as in claim 9 wherein the first voltage source comprises a direct current (DC) voltage source.

12. An apparatus as in claim 8 further comprising a diode termination resistor coupled to the first transmission line and the third transmission line, wherein the diode termination resistor is configured to reduce signal reflections without affecting the configuration of the first and second diodes.

13. An apparatus as in claim 8 wherein the device comprises a second modulator diode configured as the EOM or the EAM.

14. An apparatus as in claim 8 wherein the device comprises a dummy device that matches the parasitics of the first modulator diode.

15. An apparatus as in claim 8 wherein the dummy device comprises a capacitor.

16. An apparatus as in claim 8, wherein the bias generator comprises a third transistor having a first breakdown voltage, and wherein a second breakdown voltage of the first transistor and of the second transistor, is lower than the first breakdown voltage.

17. An apparatus as in claim 16 wherein the first transistor, the second transistor, and the third transistor are CMOS transistors.

18. An apparatus as in claim 17 wherein the first transistor, the second transistor, and the third transistor are integrated in a same CMOS process.

* * * * *